United States Patent [19]

Kubota

[11] Patent Number: 4,537,088
[45] Date of Patent: Aug. 27, 1985

[54] COLUMN SHIFT TYPE GEAR SELECTOR DEVICE FOR AN AUTOMATIC POWER TRANSMISSION OF AN AUTOMOTIVE VEHICLE

[75] Inventor: Shikibu Kubota, Musashino, Japan

[73] Assignee: Nissan Motor Company, Limited, Yokohama, Japan

[21] Appl. No.: 387,692

[22] Filed: Jun. 11, 1982

[30] Foreign Application Priority Data

Jun. 17, 1981 [JP] Japan ................................. 56-92123

[51] Int. Cl.³ .......................... G05G 9/16; G05G 5/02
[52] U.S. Cl. .................... 74/473 SW; 74/475; 74/476
[58] Field of Search ................... 74/473 SW, 475, 476

[56] References Cited

U.S. PATENT DOCUMENTS

| | | | |
|---|---|---|---|
| 1,499,427 | 7/1924 | Tullar | 74/473 |
| 2,335,444 | 11/1943 | Randol | 74/473 SW |
| 2,599,773 | 6/1952 | Neracher et al. | 74/473 |
| 2,664,761 | 1/1954 | Martin | 74/473 |
| 2,737,058 | 3/1956 | Puls | 74/472 |
| 2,896,471 | 7/1959 | Hause | 74/484 |
| 2,924,124 | 2/1960 | Froslie | 74/475 |
| 2,968,194 | 1/1961 | Thompson et al. | 74/473 |
| 3,613,474 | 7/1970 | Baumgartl | 74/473 R |
| 4,126,054 | 11/1978 | Langford et al. | 74/475 |
| 4,267,743 | 5/1981 | Tanaka | 74/473 SW |
| 4,338,828 | 7/1982 | Ruhlman | 74/475 |
| 4,365,552 | 12/1982 | Kubota et al. | 74/475 |

FOREIGN PATENT DOCUMENTS

| | | | |
|---|---|---|---|
| 3048093 | 9/1981 | Fed. Rep. of Germany . | |
| 1254353 | 1/1961 | France . | |
| 93525 | 8/1978 | Japan | 74/473 SW |
| 354676 | 7/1961 | Switzerland | 74/473 |
| 444495 | 3/1936 | United Kingdom | 74/473 |
| 716142 | 9/1954 | United Kingdom . | |
| 717868 | 11/1954 | United Kingdom . | |
| 743337 | 1/1956 | United Kingdom . | |
| 839617 | 6/1960 | United Kingdom . | |
| 854428 | 11/1960 | United Kingdom . | |
| 907201 | 10/1962 | United Kingdom . | |
| 1003195 | 9/1965 | United Kingdom . | |
| 1179202 | 1/1970 | United Kingdom . | |
| 1330806 | 9/1973 | United Kingdom . | |
| 1463415 | 2/1977 | United Kingdom . | |
| 1489426 | 10/1977 | United Kingdom . | |
| 2076085 | 11/1981 | United Kingdom . | |

*Primary Examiner*—Allan D. Herrmann
*Attorney, Agent, or Firm*—Schwartz, Jeffery, Schwaab, Mack, Blumenthal & Evans

[57] ABSTRACT

A click mechanism in the automatic power transmission gear selector device is mounted onto a bracket for mounting a control rod of the selector device onto a steering column and directly associated with the control rod. By this, click in shifting the automatic power transmission can be directly transmitted to the selector lever through the control rod.

11 Claims, 5 Drawing Figures

COLUMN SHIFT TYPE GEAR SELECTOR DEVICE FOR AN AUTOMATIC POWER TRANSMISSION OF AN AUTOMOTIVE VEHICLE

BACKGROUND OF INVENTION

The present invention relates generally to a column shift type gear selector device for an automatic power transmission of an automotive vehicle. More particularly, the invention relates to a click mechanism for a column shift type automatic power transmission gear selector device.

Generally, a click mechanism for an automatic power transmission gear selector device is provided in the automatic transmission housing. In a column shift type gear selector device, the click mechanism is connected to a selector lever with a relatively long linkage extending along the steering column. The linkage comprises a rather complicated link system and/or a cable wire. Due to the length and complexity of the linkage, it is possible for it to become loose at joint portions and to weaken the click effect when the gear position is shifted. This will degrade the operational feeling of the column shift type gear selector device. Furthermore, it may cause miss-shifting of the selector device.

As will be appreciated, the reason for the above-mentioned and other drawbacks is that the click mechanism is positioned relatively far from the selector lever. This can be improved by providing the click mechanism at a position adjacent the selector lever.

SUMMARY OF THE INVENTION

Therefore, it is an object of the present invention to provide a column shift type automatic power transmission gear selector device with a click mechanism located near a selector lever to a provide sure shifting feeling.

To accomplish the above and other objects, the click mechanism in the automatic power transmission gear selector device, according to the present invention, is mounted on a bracket for mounting a control rod of the selector device onto a steering column and directly associated with the control rod. By this arrangement, click in the shifting of the automatic power transmission can be directly transmitted to the selector lever through the control rod.

According to one aspect of the present invention, there is provided a column shift type gear selector device for an automatic power transmission of an automotive vehicle, which comprises a selector lever for manual shift operation, a control rod operatively connected at the top thereof to the selector lever, a linkage connected to the lower end of the control rod at one end and connected to a power transmission gear selector mechanism in the automatic power transmission at the other end, a locking mechanism mounted on the control rod for locking the control rod to block shift operation at a predetermined transmission gear range, the locking mechanism incorporating an unlocking means to unlock the locking mechanism to allow shift operation of the control rod from the predetermined transmission gear position to another gear position, and a click mechanism associated with the control rod, the click mechanism including a first stationary member provided adjacent the control rod and a second movable member movable with the control rod, the second member clicking with the first member at the control rod positions respectively corresponding to respective transmission gear positions.

BRIEF DESCRIPTION OF THE DRAWINGS

The present invention will be understood more fully from the detailed description given hereinbelow and from the accompanying drawings of the preferred embodiments of the invention, which, however, should not be taken as limitative to the invention are for elucidation and explanation only.

In the drawings.

DESCRIPTION OF THE PREFERRED EMBODIMENTS

Figure 1:
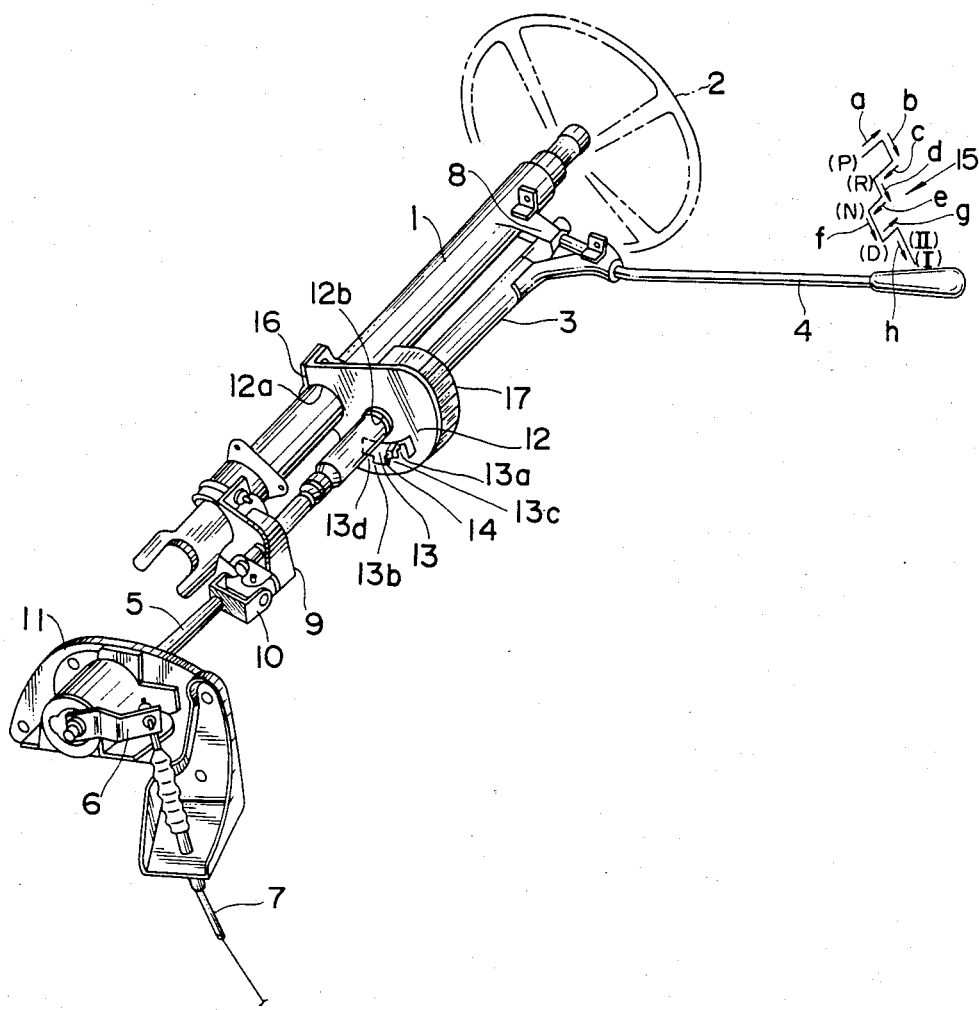
FIG. 1 is a perspective view of a preferred embodiment of a column shift type gear selector device for an automatic power transmission, with a click mechanism according to the present invention.

Referring now to the drawings, particularly to FIG. 1, there is illustrated a preferred embodiment of a column shift type automatic power transmission gear selector device according to the present invention. A control rod 3 with a selector lever 4 is supported on a steering column tube 1 by brackets 8 and 9 in axially movable and circumferentially rotatable position. The steering column tube 1 rotatably receives a steering column shaft with a steering wheel 2 at the top thereof.

The control rod 3 is connected to a connecting rod 5 through a universal joint 10 adjacent the bracket 9. The connecting rod 5 is rotatably supported on the vehicle body by a bracket 11 and is connected to an operation cable 7 via a control lever 6. The operation cable 7 is connected to a selector valve control lever (not shown) positioned in an automotive power transmission (not shown). Therefore, by operation of the selector lever 4 located adjacent the steering wheel 2, the selector valve in the automatic power transmission is shifted to a desired gear mode, i.e., first gear holding mode, second gear holding mode, drive mode in which transmission gear will be automatically shifted up and down, a neutral gear mode, park mode and reverse gear mode, via control rod 3 connecting rod 5, control lever 6 and the operation cable 7.

The selector lever 4 is adapted to be operated according to the predetermined shift pattern. In the illustrated embodiment, the selector lever 4 is shifted to a first gear holding mode "I", second gear holding mode "II", drive mode "D", neutral mode "N", reverse gear mode "R" and park mode "P", as shown in FIG. 1. The shift pattern is defined by a position plate 12 and a position lever 14 cooperatively engaged with a cut hole 13 formed in the position plate 12. When the selector lever 4 is rotated in a plane lateral to the steering column tube 1, the control rod 3 is rotated to transmit a rotational force through the connecting rod 5 to the control lever 6, thereby operating the selector valve of the automatic power transmission to a desired mode through the operation cable 7.

Figure 2:
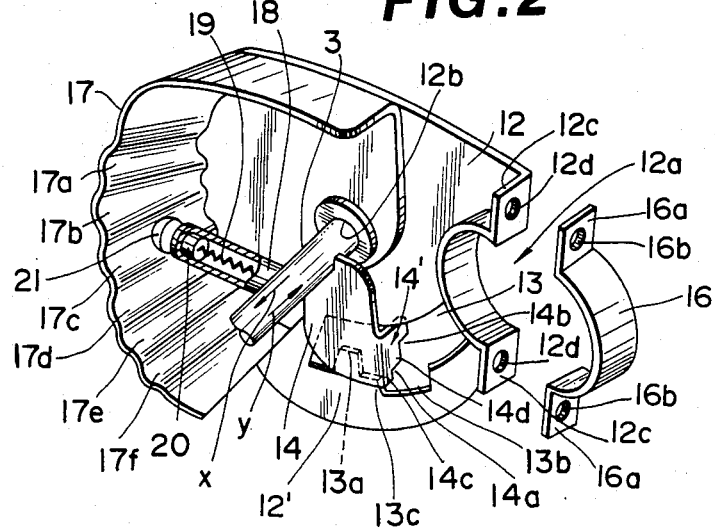
FIG. 2 is an enlarged perspective view of the click mechanism of FIG. 1 viewed from the opposite side to that of FIG. 1.
Figure 3:
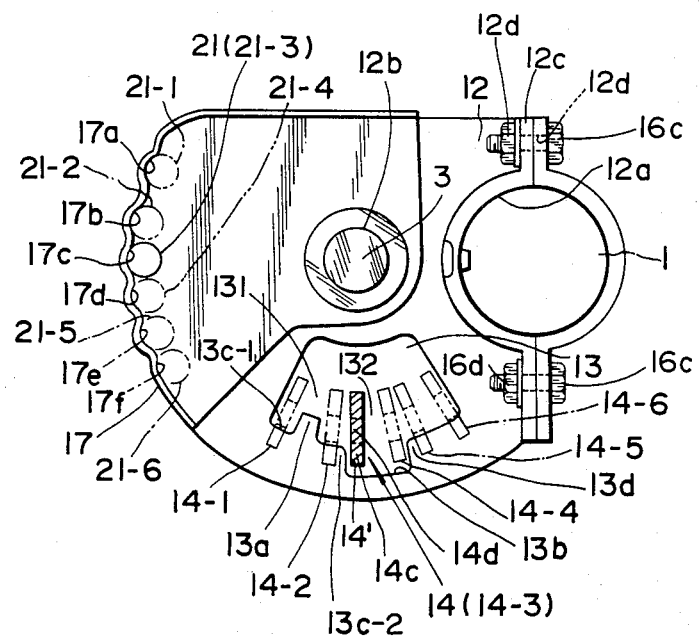
FIG. 3 is a cross-section of the click mechanism of FIG. 2.

The position plate 12 has a recessed portion 12a and a through hole 12b formed therein as clearly shown in FIGS. 2 and 3. The position plate 12 receives the control rod 3 passing through the opening 12b. On the other hand, the recessed portion 12a has a curve essentially corresponding the circumferential curve of the steering column tube 1 and is adapted to fit with the outer circumference of the latter. The recessed portion 12a has flanges 12c extending from both ends thereof. Through openings 12d are formed in the flanges 12c. To the flanges 12c, flanges 16a of a clamp member 16 are mated. The clamp member 16 has a major curved section adapted to fit with the circumference of the steering column tube 1. The flanges 16 a are respectively formed with through openings 16b to be placed in alignment with the through openings 12d of the flanges 12c. Both of mating flanges are fitted together with fastening bolts 12c and fastening nuts 16d. Thus, the position plate 12 is mounted on the steering column tube 1.

The position plate 12 is further formed with a cut-out 13 as shown in FIGS. 2 and 3. The cut-out has a plurality of steps 13c-1, 13a, 13c-2, 13b and 13d. The steps 13c-1, 13c-2, 13b and 13d respectively correspond to the park mode, reverse gear mode, neutral gear mode and drive mode, second gear holding mode and first gear holding mode as illustrated in FIG. 1, on the edge thereof. As apparent from FIG. 3, the step 13a is the highest and defines the narrowest path 131 and the step 13b is the lowest and defines the widest path 132. The remaining steps 13c-1, 13c-2 and 13d are intermediate between the steps 13a and 13b in height and at an even level with respect to each other. A position lever 14 is fixedly attached to the control rod 3 so that it may rotate with the control rod 3 as the selector lever 4 is operated. The position lever 14 is provided with a bent section 14' having a plurality of steps 14c, 14a and 14b on the lower edge thereof. The position lever 14 is fixed to the control rod 3 at a position such that the bent section 14' engages the cut-out 13 of the position plate 12.

The position plate 12 is further provided with an axially extending flange portion 17 with a waving section 17 defining a plurality of gutter portions 17a, 17b, 17c, 17d, 17e and 17f. Respective gutter portions 17a, 17b, 17c, 17d, 17e and 17f correspond to angular positions of the control rod 3 as shifted to the park mode, reverse gear mode, neutral gear mode, drive mode, second gear holding mode, respectively and first gear holding mode. On the other hand, a tubular click arm is provided on the peripheral face of the control rod 3 extending outward in the radial direction. A compression spring 19 is inserted in the click arm 18. A ball guide 20 is slidably positioned at the outer end of the click arm 18 and engaged with the spring 19 to be biased outwardly. A click ball 21 is positioned on the outer end face of the ball guide 20. Thus, the click ball 21 is resiliently biased toward the inner peripheral face of the flange portion 17 through the ball guide 20. Each gutter 17a–17f extends far enough to maintain contact with click wall 21 in any operational position of the control rod 3.

In the above construction, when the selector lever 4 is shifted to park mode in the operation pattern 15 of FIG. 1, the control rod 3 which interlocks with the selector lever 4 brings the front end of the position lever 14 to the position shown by the reference numeral 14-1 in FIG. 3 and also the click ball 21 of the position shown by the reference numeral 21-1 in FIG. 3. At this time, the front end of the position lever 14 is abutted at its stepped portion 14c against the plane face 12' of the position plate 12, while its stepped portion 14d is brought to the position overlying the step 13c-1 in FIG. 3. At this position, the click ball 21 rests in the gutter 17a.

In the park position, the selector lever 4 may not be moved directly downward as shown by the operation pattern 15 in FIG. 1, and thus, there is no danger than an erroneous operation can occur or that the lever 4 is accidently shifted to a running stage. Such movement is prevented since direct downward movement of lever 4 results in the stepped portion 14d colliding with the projecting portion defining the step 13a. In case where the selector lever is required to be operated to another range, then the driver first pulls the selector lever 4 with the control rod 3 as shown by the arrow a from the P-mode (e.g. see FIG. 1). In this manner, the control rod 3 is displaced in the corresponding axial directions shown by the reference symbol x, (see FIG. 2) thereby bringing the stepped portion 14d to such a position that it does not interfere with the projecting portion of step 13a, and the selector lever 4 now can be shifted to any other gear mode as shown by the arrow b in FIG. 1. Due to this shift operation, the control rod 3 is rotated in the corresponding direction and brings the format end of the position lever 14 to the position as shown by the reference numeral 14-2 in FIG. 3, while, the click ball 21 is brought to the position as shown by the reference numeral 21-2 in FIG. 3. Thus, from the shifting and resettling of the click ball 21, when the click ball 21 changes its position from the gutter 17a to 17b, the driver can sense that the selector valve has been shifted to the reverse gear mode. Thereafter, when the driver releases the hand from the selector lever 4, the control rod 3 is returned back in the axial direction as shown by the arrow y in FIG. 2 by a return spring (not shown) of the selector device. The motion of the control rod 3 in the axial direction 3 is limited by engagement of the front end of step 14c of the position lever 14 at the position as shown by the reference numeral 14-2 in FIG. 3 against the face 12' of the position 12 in same manner as when selecting the above park mode. Therefore, the control rod 3 as well as the selector lever 4 is maintained in the reverse gear mode at the same position in the axial direction as when selecting the park mode. At this time, the selector lever 4 is displaced in the direction away from the driver as shown by the arrow c in FIG. 1 for interlocking the position plate and position lever by the axial movement of the control rod 3.

Thereafter, when the driver shifts the selector lever 4 further as shown by the arrow d in FIG. 1, the control rod 3 is rotated to bring the click ball 21 to the position as shown by the reference numeral 21-3 in FIG. 3, thereby letting its position be changed from the gutter 17b to 17c. The driver can sense from the nodal feeling at this time that the selector lever has been shifted to the neutral gear mode. And, at this time, the control rod 3 has brought the front end of the position lever 14 to the position as shown by the reference numeral 14-3 in FIG. 3, and the stepped portion 14c is disengaged from the face on the side of the driver of the position plate 12, so that the movement of the control rod 3 in the axial direction as shown by the arrow y in FIG. 2 is not interrupted. Accordingly, the control rod 3 is further displaced by the above return spring (not shown) in the direction as shown by the arrow y in FIG. 2, thereby letting the stepped portion 14c intrude into the recessed portion defining the step 13b and remain therein. By such aaxial movement of the control rod 3, the selector lever 4 is further displaced in the direction away from the driver as shown by the arrow e in FIG. 1 to reach the neutral gear mode.

When the selector lever 4 is further shifted from the neutral position as shown by the arrow f in FIG. 1, the front end of the position lever 14 is brought by the control rod 3 to the position as shown by the reference numeral 14-4 in FIG. 3 and, since the front end of stepped portion 14c of the position lever is freely movable in the recessed portion at this time, the above movement of the selector lever 4 is not interrupted and thus the selector lever reaches the drive mode in the operation pattern 15 in FIG. 1 to shift the selector valve to the drive mode. During this shift operation, the control rod 3 brings the click ball 21 to the position as shown by the reference numeral 21-4 in FIG. 3. From the nodal feeling at the time when the position of the click ball 21 is changed from the gutter 17c to 17d, the driver can sense that the selector valve has been operated to the drive mode.

If the driver tries to shift the power transmission gear down to second or first gear holding mode from the drive mode, such a shift operation will be interrupted since the stepped portion 14c contacts the stepped portion 13d. In case where the selector lever 4 is to be shifted to the adjacent second gear holding mode and first gear holding mode, it is first pulled in the direction as shown by the arrow g in FIG. 1. Then, the front end of the selector lever 14 is displaced by the control rod 3 at the position as shown by the reference numeral 14-4 in FIG. 3 and is brought to such a position that the stepped portion 14c does not interfere with the stepped portion 13d. Accordingly, by shifting the selector lever 4 in the direction as shown by the arrow h in FIG. 1 to orderly operate it to the second gear holding mode or the first gear holding mode, the selector lever can be operated to the second gear holding mode or the first gear holding mode, and at this time, the front end of the position lever 14 is moved to the position as shown by the reference numeral 14-5 or 14-6 in FIG. 3, while the click ball 21 is brought to the position as shown by the reference numeral 21-5 or 21-6. Thus, when operating the selector lever 4 from the drive mode to the second gear holding mode, the click ball 21 changes its position from the gutter 17d to 17e, and when operating the selector lever 4 from the II-position to the I-position, the click ball 21 changes its sunken position from the gutter 17e to 17f, and the driver can sense from the nodal feeling which occurs at the time of this position change that the manual lever has been operated to the II-range or the I-range.

Thus, as described above, the control device of the present invention can provide the nodal or click feeling at each transmission gear position and let the driver sense the completion between the the shift operation of respective ranges of the selector lever, and further, since the click mechanism is arranged in an interlocking relation with the control rod 3 near the selector lever 4, even with a column shift type mechanism, the driver can sense the above nodal feeling with certainty and thus there can be achieved both the improvement of the operational feeling and the prevention of any misshifting.

Meanwhile, in the illustrated embodiment, the click plate 17 as the main part of the click mechanism is mounted on the position plate 12 which is securely mounted on the steering column tube 1 so that the shift pattern of the selector lever 4 may be effected in cooperation with the position lever 14 mounted on the control rod 3. By this arrangement, the relative positioning and fitting of the click plate 17 to the steering column tube 1 can be automatically carried out when fitting the position plate 12, and thus there can be provided both the improvement of the fitting workability and the reduction of the number of parts.

Figure 4:
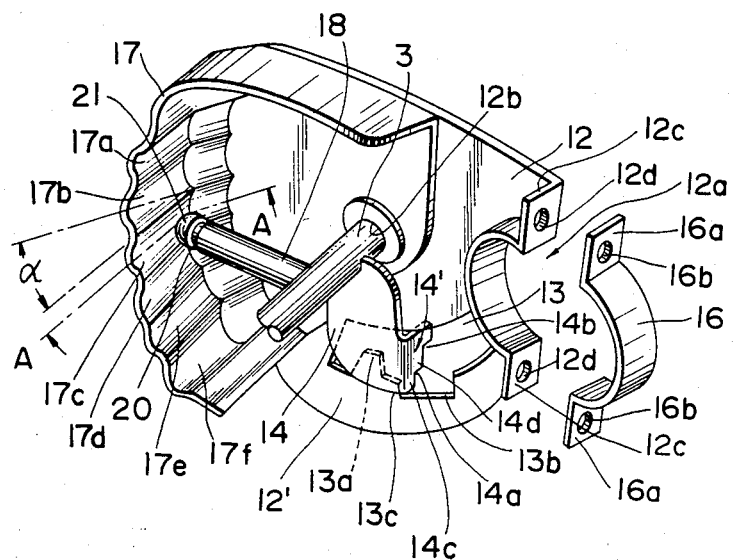
FIG. 4 is a perspective view similar to FIG. 2 but showing another embodiment of the click mechanism according to the invention.
Figure 5:
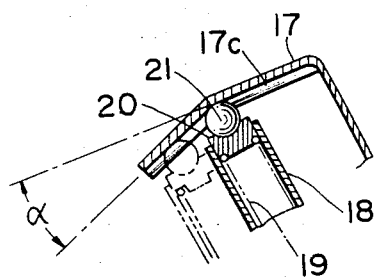
FIG. 5 is a section taken along line V—V of FIG. 4.

FIGS. 4 and 5 illustrate another embodiment of the present invention. In this embodiment, each of the gutters 17a-17f does not have a straight configuration in the longitudinal direction thereof as in the embodiment described above, but is provided with a tilt angle $\alpha$ at an intermediate portion of the gutter between divided portions thereof in such a manner that the gutter gradually slopes down from both sides toward the intermediate portion. The intersection of these divided portions is positioned where the click ball 21 can sink in the intersection of the divided gutter portions when the control rod 3 is in the axial position corresponding to the N-position and the drive mode of the operation pattern 15 in FIG. 1.

In the construction of this embodiment, if the driver pulls the selector lever 4 toward his side from the line of the neutral gear mode and the drive mode so as to bring the click ball 21, for example, to the position as shown by phantom line in FIG. 5 through the click arm 18, then spring force of the spring 19 provides the control rod 3 with a component force derived from the tilt angle $\alpha$ and in the axial direction going away from the driver, so that the control rod is forced to return back toward the axial corresponding to the line of the neutral gear mode and the drive mode. In other words, due to the slope $\alpha$ of the gutters 17a-17f, the control rod 3 is resiliently retained by the spring force of the spring 19 in the axial position where both the neutral gear mode and the drive gear mode of the selector valve can be selected. This either eliminates the necessity of the aforementioned return spring which conventionally has been separately provided for this purpose in the control device or allows the return spring to be made smaller.

What is claimed is:

1. A column shift type gear selector device for an automatic power transmission of an automatic vehicle comprising:
   a manually operated selector lever mounted on a steering column for controlling the shift operation of said automatic power transmission;
   a control rod connected to said selector lever and extending along said steering column and movable in accordance with movement of said selector lever in axial and circumferential directions with respect to the axis thereof, to shift the transmission to a desired gear ratio;
   a linkage connected to said control rod and to a power transmission gear selector mechanism in the automatic power transmission;
   a locking means associated with said control rod for locking said control rod to block the shift operation in at least one predetermined transmission gear position, said locking means incorporating an unlocking means associated with said control rod and responsive to axial movement of the latter for unlocking said locking means to allow a shifting operation of said control rod from said at least one predetermined transmission gear position to another gear position; and a click mechanism positioned adjacent said control rod, said click mechanism including a first stationary member mounted on said steering column and located adjacent said control rod and a second movable member movable with said control rod, said second member being biased for clicking engagement with said first member at the control rod positions respectively corresponding to respective transmission gear positions, said first member having an axial length sufficiently long to allow axial movement of said second member while maintaining clicking engagement between said first member and said second member.

2. A device as set forth in claim 1, wherein said unlocking means are selectively actuated by axial movement of said control rod in response to corresponding movement of said selector lever.

3. A column shift type gear selector device for an automatic power transmission of an automatic vehicle comprising:
- a manually operable selector lever mounted on a steering column and movable in axial and circumferential directions of said steering column for controlling the shift operation of said automatic power transmission;
- a control rod disposed generally axially parallel to said steering column and movably connected on said steering column, and said control rod being connected at the upper portion thereof to said selector level for movement therewith;
- a linkage connected to the lower portion of said control rod and to a power transmission gear selector mechanism in the automatic power transmission;
- a locking mechanism mounted on said steering column and associated with said control rod, said locking mechanism said control rod to inhibit the shift operation from at least one predetermined transmission gear position, said locking mechanism including an unlocking means associated with said control rod and responsive to axial movement of the latter for unlocking said locking mechanism to allow a shift operation of said control rod from said at least one predetermined transmission gear position to another gear position; and
- a click mechanism positioned adjacent said control rod, said click mechanism including a first stationary member secured on said steering column at a position adjacent said control rod and a second movable member movable with said control rod, said second member making clicking engagement with said first member at the control rod positions respectively corresponding to respective transmission gear positions, said first member having an axial length sufficiently long to allow axial movement of said second member while maintaining clicking engagement between said first member and said second member.

4. A device as set forth in claim 2, wherein said unlocking means are selectively actuated by axial movement of said control rod in response to corresponding movement of said selector lever.

5. A column shift type gear selector device for an automatic power transmission of an automatic vehicle comprising:
- a manually operable selector lever movably mounted on a steering column for controlling the shifting operation of said automatic power transmission into various transmission gear positions;
- a control rod movably supported on said steering column for movement in axial and circumferential directions with said selector lever;
- a linkage connected to said control rod and to a power transmission gear selector mechanism in the automatic power transmission, the transmission gear position being selected corresponding to magnitude of circumferential movement of the control rod;
- a locking mechanism mounted adjacent said control rod, said locking mechanism locking said control rod to inhibit shift operation at a predetermined transmission gear position, said locking mechanism incorporating an unlocking means for unlocking said locking mechanism to allow shift operation of said control rod from said predetermined transmission gear position to another gear position, said unlocking means being selectively actuated by axial movement of said control rod in response to corresponding movement of said selector lever; and
- a click mechanism positioned adjacent said control rod, said click mechanism including a first stationary member fixed on said steering column adjacent said control rod and a second movable member movable with said control rod and engageable with said first stationary member, said second member being biased for clicking engagement with said first member at the control rod positions respectively corresponding to respective transmission gear positions, said first member having an axial length sufficiently long to allow axial movement of said second member while maintaining clicking engagement between said first member and said second member.

6. A device as set forth in any one of claims 1, 3 or 5, wherein said first stationary member of said click mechanism comprises a click plate extending transverse to the axial direction of said control rod and a flange portion having a plurality of grooves extending substantially parallel to the axis of said control rod, and said second movable member includes a member resiliently biased toward said click plate for clicking engagement with the grooves thereof according to the rotational motion of the control rod.

7. A device as set forth in claim 6, wherein said second movable member comprises a cylindrical member laterally extending from said control rod for movement with the control rod in the axial and circumferential directions of said control rod, a bias spring inserted in said cylindrical member and a ball member mounted at the outer end of said cylindrical member and normally urged toward the grooves of said flange portion of said click plate by said bias spring.

8. A device as set forth in claim 5, wherein said locking mechanism includes a stationary member defining a shift pattern of the selector lever and a movable member attached to said control rod and engageable with said stationary member to define the movement of the selector lever with said control rod according to the shift pattern.

9. A device as set forth in claim 8, wherein said stationary member of said locking mechanism is integrally formed with said click mechanism.

10. A device as set forth in claim 9, wherein said stationary member serves as a bracket for movably supporting said control rod on said steering column.

11. A device as set forth in claim 5, wherein said unlocking means are selectively actuated by axial movement of said control rod in response to corresponding movement of said selector lever.

* * * * *